United States Patent [19]

Reinten

[11] Patent Number: 4,878,072
[45] Date of Patent: Oct. 31, 1989

[54] LED AGE CORRECTION MEANS

[75] Inventor: Hans Reinten, Velden, Netherlands

[73] Assignee: OCE-Nederland B.V., Venlo, Netherlands

[21] Appl. No.: 241,941

[22] Filed: Sep. 8, 1988

[30] Foreign Application Priority Data

Sep. 11, 1987 [NL] Netherlands ............... 8702166

[51] Int. Cl.$^4$ ............................................. G01D 15/00
[52] U.S. Cl. ............................ 346/154; 346/160; 400/53
[58] Field of Search ............... 346/154, 160, 107 R, 346/108; 358/300, 302; 400/53; 350/332, 333; 364/518, 519

[56] References Cited

U.S. PATENT DOCUMENTS 4,477,821 10/1984 Yamamoto ................. 358/300
4,799,071 1/1989 Zeise et al. ................. 400/53

Primary Examiner—Arthur G. Evans
Attorney, Agent, or Firm—Reed Smith Shaw & McClay

[57] ABSTRACT

An aging correction system for an LED array in a printer, in which each LED can be energized during a variable time and in which a light sensor, with which the relative light-output of each LED can be measured and compared with earlier measured values, is disposed near the array, and in which on the basis of these measured values a new correction value is determined.

6 Claims, 1 Drawing Sheet

LED AGE CORRECTION MEANS

FIELD OF THE INVENTION

The invention relates to an exposure device for the linewise and imagewise exposure of a photosensitive layer using an LED array and in particular to a correction means in which a light sensor is used to measure LED output and provide an absolute correction factor to compensate for aging or deterioration.

BACKGROUND OF THE INVENTION

An exposure device in which individual LED arrays are energized, for example, symmetrically about an imaginary line that extends parallel to the array for variable time for each image has been disclosed in U.S. Pat. No. 4,712,116. LED exposure devices are especially useful in printers, for example, U.S. Pat. No. 4,455,562.

Generally in these devices, such as in the U.S. Pat. No. 4,455,562, the absolute light intensity of each LED on the photosensitive layer is determined, and an absolute correction number is derived from this and stored in a memory. The absolute correction number is used to energize each individual LED per image line for a time which is inversely proportional to the light intensity of said LED. In this way the LED's are energized with pulse time modulation and each LED is supposed to deliver the same amount of light to the photosensitive layer per image point.

When an LED is used, however, aging occurs. Typically, the emitted quantity of light decreases as a function of the period of use. This aging will not be equal for all the LED's because the period of use of each individual LED depends on the information content of the images under formation and also because LED's which emit less light per image line have to be energized longer than the LED's which emit more light. Thus, where automatic compensation means such as U.S. Pat. No. 4,839,672 are not incorporated into the device the absolute correction numbers must be adapted after many hours of use. In known devices such as United Kingdom Application above, the absolute light intensity of the photosensitive layer has to be continually redetermined. This means that a service engineer is required to carry out an absolute light measurement for each LED on the photosensitive layer at specific intervals or that the array of LED's will have to be removed from the printer to determine the absolute correction numbers in a test rig.

It is also known from U.S. Pat. No. 4,588,883 to provide an array of LED's on a substrate with a detector for measuring the light intensity of each LED, but this detector has the same length as the array of LED's and the absolute light intensity of each LED is always measured by means of this detector. A disadvantage of this is that it is difficult to ensure equality due to the considerable length of the detector. Local soiling causes considerable inequalities. Also, each LED is contained in a control circuit, the current through the LED being adjusted so that the absolute light intensity of the LED remains constant. Controlling the current through an LED so that the light intensity remains constant is difficult at high switching speeds because the switching-on time for the LED varies so that the individual image points per image line are not imaged on one and the same line.

Accordingly, it is an object of the invention to provide a means for determining the absolute correction numbers without the need to remove the LED array from the device. It is a further objective to provide an accurate means for compensating for the aging of an LED in an array of LED's used in printing devices.

SUMMARY OF THE INVENTION

Generally, the exposure device of the present invention provides at least one light-sensor which is smaller than the array of LED's located near the array of LED's and at a fixed location with respect to them. The light-sensor measures the relative light intensity of each individual LED. A memory system is provided with a first table in which the measured relative light intensity of each LED is stored and with an aging table. The aging table is periodically updated with the light intensity of each individual LED measured by the light-sensor. On the basis of the data in the aging table and the corresponding data in the first table a control means determines a new absolute correction number for each LED.

Consequently, the new correction numbers determined for each LED automatically equalizes the light output of each LED over its lifetime even in the event of aging.

The present invention overcomes the difficulties associated with certain prior art compensation devices having a detector of the same length in the array. Other advantages will become apparent from a perusal of the following detailed description of the presently preferred embodiment taken in connection with the accompanying drawings.

PRESENTLY PREFERRED EMBODIMENT

Figure 1:
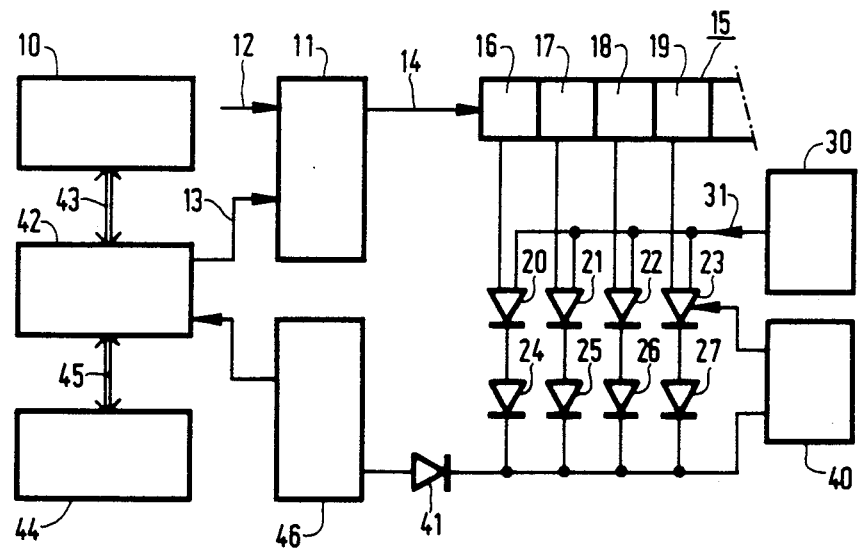
FIG. 1 is a diagram showing a control device in an exposure device according to the invention.

Referring to FIG. 1, a portion of a straight array of LED's comprising individual LED's 24 to 27 is illustrated. An array of LED's of this kind is generally constructed from a large number of individual LED's at a density of about 20 LED's per mm. If an array of LED's of this kind is used as an exposure source for an electrophotographic printer, an array must contain about 6,000 LED's.

In an electrophotographic printer, the array is preferably disposed at a short distance, preferably about 10 mm from the photoconductive layer. Between the array and the photoconductive layer there is positioned an array of imaging glass fibers which can form an image of each LED on the photoconductor. A memory 10 is provided to store a correction table for each LED 24 to 27. This table contains a four-bit absolute number which is related to the energization time required to make the absolute quantity of light on the photosensitive layer equal per image line. The absolute correction number is related to the absolute light intensity of an LED. When the array of LED's is manufactured, the correction table is preferably compiled in a test rig and stored in memory 10.

A control device 42 is provided and is connected to memory 10 via bus 43. Control device 42 can call up the four-bit absolute correction numbers from the memory and feed them serially to combination circuit 11 via bus 13. This combination circuit 11 comprises a D/A converter in which a four-bit correction number is converted to a corresponding d.c. voltage. Via line 12, an image signal is also fed to combination circuit 11 and this image signal is multiplied by the d.c. voltage. If the image signal is logic 1 then the d.c. signal is fed via line 14 to an analog shift register 15. If the image signal is logic 0, then no signal is available over line 14. Memory 10 is addressed by control device 42 in synchronization with the image signal supplied. The analog shift register 15 of the series-in parallel-out type is thus filled with the data concerning a complete image-line. Each parallel output of the shift register 15 is connected to an input of one of the comparator circuits 20 to 23. Thus, the output of place 16 of shift register 15 is connected to an input of comparator circuit 20, place 17 of shift register 15 to an input of comparator circuit 21, and so on.

The outputs of comparator circuits 20 to 23 are each connected to an LED 24 to 27. For each image line to be imaged, signal generator 30 delivers a trapezoidal pulse as described in detail in U.S. Patent No. 4,712,116 incorporated herein by reference. If the value of the output signal of place 16 of shift register 15 is greater than the instaneous value of the pulse of signal generator 30, the output of comparator circuit 20 will become "high" and LED 24 will be energized. When the instantaneous value of the pulse of signal generator 30 becomes greater than the value of the output signal 16 of the shift register 15, the output of the comparator circuit 20 will become "low" and LED 24 will cut off. Similarly, the other LED's 25 to 27 will be energized for a specific time per image line. An adjustable current source 40 is connected to all the comparator circuits. By means of current source 40 all of the LED's are subjected to an identical current on energization.

A photodiode 41 is positioned near the array of LED's. It is positioned so that the relative light intensity of each LED can be measured with it. The measured relative light intensity signals are fed via an A/D converter 46 to the control device 42 and are stored in a first table of memory 10. Preferably, the first table is loaded into the memory during the manufacture of the array of LED's. A volatile memory 44 is also connected to control device 42 via bus 45.

When a printer using the LED array and control system described above is started up, the relative light intensity of each LED is measured by means of photodiode 41 and stored in an aging table in volatile memory 44 by A/D converter 46 and control device 42.

During printing of an image, the contents of the first memory location in the first table of memory 10 are divided by the control device 42 by the contents of the first memory location of the aging table in volatile memory 44. The quotient obtained is multiplied by the corresponding four-bit absolute correction number in the control device 42. The resulting new absolute correction number is fed via bus 13 to combination circuit 11. In this way, new absolute correction numbers are derived serially for all the LED's 20 to 23 and are used in the image-forming operation.

The new absolute correction numbers need not be recalculated for each image line. Once the numbers have been determined they can be placed in a new table in volatile memory 44 and then used in further image-forming operations.

Figure 2:
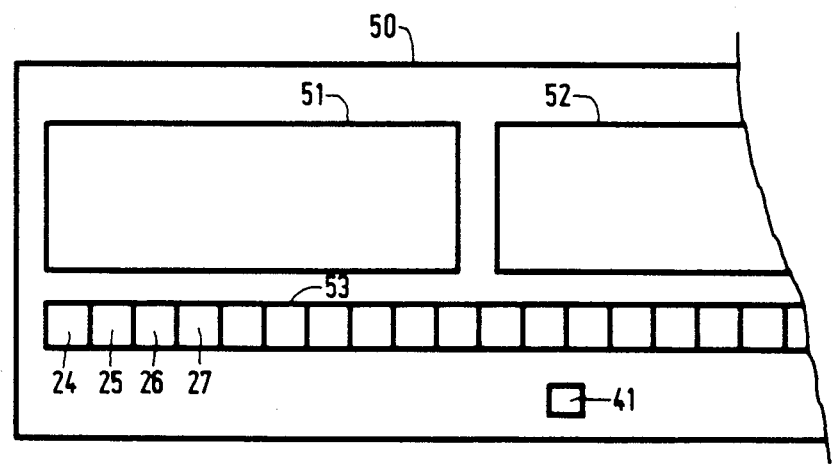
FIG. 2 is a top plan view of a straight array of LED's on a substrate.

FIG. 2 shows a straight partial array of LED's 53 disposed on a substrate 50. Some of the circuits described with reference to FIG. 1 are accommodated in IC's 51, 52. A photodiode 41 is also positioned on substrate 50.

An array of LED's for a printer is generally assembled from a number of individual partial arrays each positioned on a substrate. The partial arrays are aligned and disposed on a support. In the exposure device described, each partial array of LED's is provided with a light-sensor 41 so that a number of light-sensors occurs over the entire array. Each light-sensor is used to measure the relative light intensity of a partial array.

The absolute correction numbers determined during manufacture and the relative light intensity measured for each LED are stored in a non-volatile memory (e.g., an EPROM). This non-volatile memory can also be disposed on the support 50 and may form part of memory 10 described with respect to FIG. 1.

The exposure device according to the invention can also be provided with just one light-sensor disposed outside the support. The relative light intensity of each LED can then be determined with this sensor. The new absolute correction number as determined can also be used for service diagnosis. In such a case control device 42 is provided with a comparator circuit in which the new absolute correction number is compared each time with the predetermined value. This predetermined value corresponds to a one hundred percent duty cycle, or continuous "on" if a number of image points have to be printed successively.

If the value of the new absolute correction number becomes greater than the predetermined value, the control device delivers a warning signal. The printer operator is thus advised that the array of LED's is due for replacement and pass this to the service organization.

In order to measure the aging and/or changes in the system, an extra LED can be disposed on the support. This extra LED is not being used for image formation. Rather, this LED is only used as a reference light source in order to periodically test the decline or soiling of the light sensor.

The invention is not restricted to the embodiment of the exposure device described. Thus the entire circuit can be made completely digital and the skilled addressee will be able to make numerous variations all of which, however, will fall within the scope of the following claims.

What is claimed is:

1. An exposure device for line and imagewise exposure of a photosensitive layer, comprising:
   a. an array of LED's;
   b. a control device connected to said LED array to energize each LED individually for a variable time per image line by means of an absolute correction number;
   c. a memory means connected to said control device and including a first table for storing the relative intensity of each LED and an aging table for storing for each individual LED the light intensity thereof measured by said light-sensor; and
   d. at least one light-sensor smaller than said array of LED's, said sensor being located a fixed distance from said LED array for measuring the relative light intensity of each individual LED connected to said control device;
   whereby said control device determines a new absolute correction number for each LED based on said data stored in said aging table and corresponding data in said first table.

2. An exposure device according to claim 1, in which the array of LED's comprises a number of individual partial arrays which are disposed on a support together with a number of control circuits and wherein said light-sensors are disposed on said support.

3. An exposure device according to claim 1 or 2, wherein said control device delivers a warning signal when a new absolute correction number exceeds a predetermined value.

4. An exposure device comprising a partial array of LED's mounted on a support means, an associated control circuit mounted on said support means and having a memory for storing an aging table, and a light sensor mounted on said support for measuring the relative intensity of light from said array, said sensor being smaller in size than said array.

5. An exposure device as set forth in claim 4 wherein said support means comprises a plurality of individual supports each including a partial array of LED's with associated control circuit and light sensor.

6. An array of LED's mounted on a support means, an associated control circuit for said array mounted on said support means and having included therein a memory means having at least an aging table stored therein, and a light sensor for measuring the relative intensity of each LED in said array, said sensor being of a size smaller than said array, whereby said support is adapted to be configured with other supports to comprise an exposure device.

* * * * *